(12) United States Patent
Choi et al.

(10) Patent No.: US 10,341,216 B2
(45) Date of Patent: Jul. 2, 2019

(54) COMPLIANCE TEST APPARATUS AND METHOD FOR A COMMUNICATION NODE

(71) Applicant: Hyundai Motor Company, Seoul (KR)

(72) Inventors: Sung Ho Choi, Gyeonggi-do (KR); Bong Keun Jeon, Gyeonggi-do (KR); Woo Sub Kim, Gyeonggi-do (KR); Seong Jin Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 15/259,257

(22) Filed: Sep. 8, 2016

(65) Prior Publication Data

US 2017/0070451 A1 Mar. 9, 2017
US 2019/0052581 A9 Feb. 14, 2019

(30) Foreign Application Priority Data

Sep. 8, 2015 (KR) .................. 10-2015-0127159

(51) Int. Cl.
*H04L 12/24* (2006.01)
*H04L 12/26* (2006.01)
*H04L 12/939* (2013.01)
*H04L 29/06* (2006.01)
*H04L 29/08* (2006.01)

(52) U.S. Cl.
CPC ............. *H04L 43/50* (2013.01); *H04L 41/24* (2013.01); *H04L 43/0817* (2013.01); *H04L 43/12* (2013.01); *H04L 49/555* (2013.01); *H04L 67/12* (2013.01); *H04L 69/26* (2013.01)

(58) Field of Classification Search
CPC ........ H04L 67/12–67/125; H04L 69/26; H04L 2012/40208–2012/40254; H04L 41/08; H04L 41/20–41/24; H04L 43/02–43/50; H04L 49/55–49/557; H04B 1/082
See application file for complete search history.

(56) References Cited

U.S. PATENT DOCUMENTS

| 8,699,356 B2* | 4/2014 | Smart ............... H04L 43/50 370/242 |
| 2016/0191418 A1* | 6/2016 | Kong ............... H04L 49/15 370/400 |
| 2017/0039059 A1* | 2/2017 | Gintz ............... H04L 67/12 370/242 |

* cited by examiner

*Primary Examiner* — Timothy J Weidner
(74) *Attorney, Agent, or Firm* — Mintz Levin Cohn Ferris Glovsky and Popeo, P.C.; Peter F. Corless (57) ABSTRACT

An apparatus for a compliance test on a communication node includes: a monitoring port; a switch turning on or off a connection between the monitoring port and a communication port connected to the communication node; and a processor controlling the switch to turn on or off the connection between the monitoring port and the communication port.

12 Claims, 5 Drawing Sheets

COMPLIANCE TEST APPARATUS AND METHOD FOR A COMMUNICATION NODE

CROSS-REFERENCE TO RELATED APPLICATIONS

This application claims the benefit of and priority to Korean Patent Application No. 10-2015-0127159 filed on Sep. 8, 2015 in the Korean Intellectual Property Office (KIPO), the entire contents of which are hereby incorporated by reference as if fully set forth herein.

BACKGROUND

1. Technical Field

The present disclosure relates generally to compliance test technologies for a communication node constituting a vehicle network, and more specifically, to a technique for performing a compliance test for a communication node as equipped in a vehicle.

2. Description of the Related Art

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. For instance, the power train control system may include an engine control system, an automatic transmission control system, etc. The body control system may include a body electronic equipment control system, a convenience apparatus control system, a lamp control system, etc. The chassis control system may include a steering apparatus control system, a brake control system, a suspension control system, etc. The vehicle network may include a controller area network (CAN), a FlexRay-based network, a media oriented system transport (MOST)-based network, etc. The multimedia system may include a navigation apparatus system, a telematics system, an infotainment system, etc.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection-based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system and the infotainment system, as well as enhanced safety systems of a vehicle, require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered a vehicle network. The Ethernet-based network may support bi-directional communication through one pair of windings and may support a transmission rate of up to 10 Gbps.

The CAN network which is widely used as a vehicle network uses a bus-type topology. Accordingly, a network compliance test can be performed through measurements on transmit/receive messages for communication nodes connected to the network. Meanwhile, the Ethernet-based network uses a switch-based network topology.

In this regard, a network compliance test for an Ethernet-based communication node is performed only as a component which is not yet installed in a vehicle. Therefore, a method and an apparatus for performing in-vehicle network compliance tests for a physical layer, etc. of communication nodes is required.

SUMMARY

Accordingly, embodiments of the present disclosure are provided to substantially obviate one or more problems due to limitations and disadvantages of the related art.

Embodiments of the present disclosure provide an apparatus for a compliance test on a communication node constituting a vehicle network, which can perform the compliance test as the communication node is installed in a vehicle. Embodiments of the present disclosure also provide a method for a compliance test on a communication node constituting a vehicle network, which can be performed as the communication node is installed in a vehicle.

In accordance with the embodiments of the present disclosure, an apparatus for a compliance test on a communication node constituting a communication network includes: a monitoring port; a switch turning on or off a connection between the monitoring port and a communication port connected to the communication node; and a processor controlling the switch to turn on or off the connection between the monitoring port and the communication port.

The processor may control the switch based on a test request signal.

The test request signal may include at least one of identification information corresponding to the communication port and mode type information indicating a compliance test mode.

The processor may control the switch to turn off the connection between the monitoring port and the communication port in a normal mode, and may control the switch to turn on the connection between the monitoring port and the communication port in a compliance test mode.

The switch may be configured with at least one semiconductor element.

A test response signal corresponding to the mode type information may be transmitted to a test output apparatus which outputs a result of the compliance test performed on the communication node through the monitoring port.

The mode type information may correspond to a code value to be configured in a register of the communication node.

The compliance test may be performed as the communication node is connected to a vehicle network.

Furthermore, in accordance with the embodiments of the present disclosure, a method for a compliance test on a communication node constituting a communication network includes: receiving a test request signal for the communication node; turning on or off a connection between a monitoring port and a communication port connected to the communication node based on the received test request signal; and transmitting a test response signal for the communication node through the monitoring port.

The communication port may be connected to the monitoring port based on identification information corresponding to the communication port that is included in the received test request signal.

The connection between the monitoring port and the communication port may be turned off in a normal mode, and the connection between the monitoring port and the communication port may be turned on in a compliance test mode.

The test response signal may be transmitted to a test output apparatus which outputs a result of the compliance test performed on the communication node through the monitoring port.

The test request signal includes mode type information which may correspond to a code value to be configured in a register of the communication node.

The compliance test may be performed as the communication node is connected to a vehicle network.

According to embodiments of the present disclosure, a compliance evaluation of a communication node can be performed not as the node is a component which is not installed in a vehicle, but as the node is installed in a vehicle. Also, according to embodiments of the present disclosure, an additional connection bride is not required for the in-vehicle network compliance test of the communication node.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although embodiments are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several embodiments, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 1:
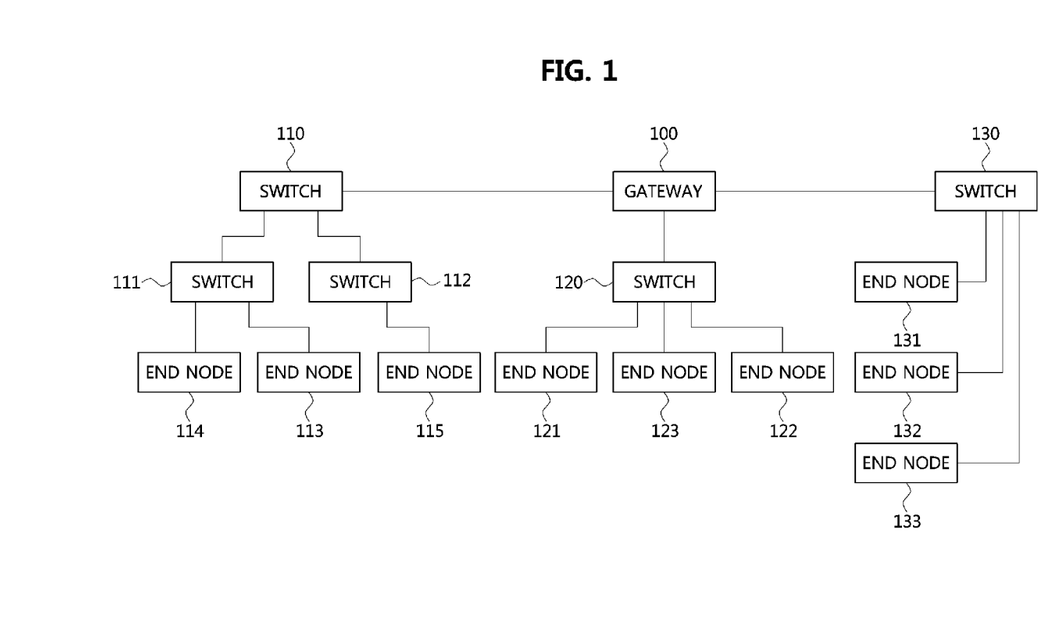
FIG. 1 is a diagram illustrating a vehicle network topology according to embodiments of the present disclosure.

FIG. 1 is a diagram showing a vehicle network topology according to embodiments of the present disclosure.

As shown in FIG. 1, a communication node may include a gateway, a switch (or bridge), or an end node. The gateway 100 may be connected with at least one switch 110, 110-1, 110-2, 120, and 130 and may be configured to connect different networks. For example, the gateway 100 may connect a switch that supports a controller area network (CAN) (e.g., FlexRay, media oriented system transport (MOST), or local interconnect network (LIN)) protocol and a switch that supports an Ethernet protocol. Each of the switches 110, 110-1, 110-2, 120, and 130 may be connected with at least one end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and operate at least one of end nodes connected to the switch.

The end nodes 111, 112, 113, 121, 122, 123, 131, 132, and 133 may include an electronic control unit (ECU) configured to operate various types of devices mounted within a vehicle. For example, the end nodes 111, 112, 113, 121, 122, 123, 131, 132, and 133 may include an ECU configured to operate an infotainment device (e.g., a display device, a navigation device, and an around view monitoring device).

Communication nodes (e.g., a gateway, a switch, an end node, or the like) included in a vehicle network may be connected in a star topology, bus topology, ring topology, tree topology, mesh topology, etc. In addition, the communication nodes of the vehicle network may support a CAN protocol, FlexRay protocol, MOST protocol, LIN protocol, or Ethernet protocol. Exemplary embodiments of the present disclosure may be applied to the above-described network topologies. The network topology to which exemplary embodiments of the present disclosure may be applied is not limited thereto and may be configured in various ways.

Figure 2:
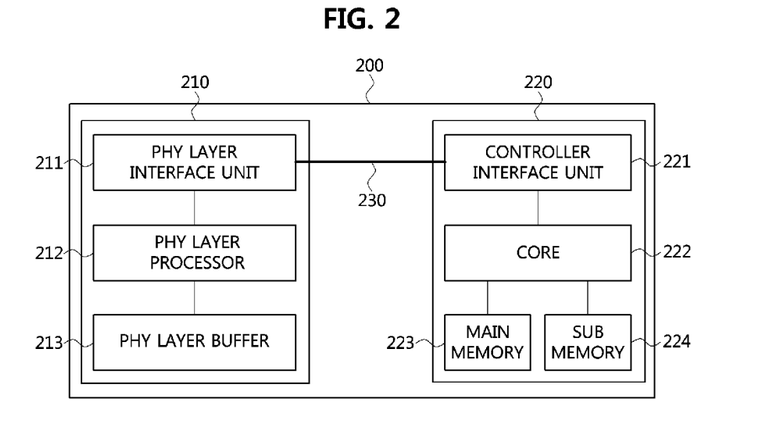
FIG. 2 is a diagram illustrating a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory, as described above.

As shown in FIG. 2, a communication node 200 of a network may include a PHY layer block 210 and a controller 220. In addition, the communication node 200 may further include a regulator (not shown) for supplying power. In particular, the controller 220 may be implemented to include a medium access control (MAC) layer. A PHY layer block 210 may be configured to receive or transmit signals from or to another communication node. The controller 220 may be configured to operate the PHY layer block 210 and perform various functions (e.g., an infotainment function). The PHY layer block 210 and the controller 220 may be implemented as one system on chip (SoC) or alternatively, may be implemented as separate chips.

Further, the PHY layer block 210 and the controller 220 may be connected via a media independent interface (MII) 230. The MII 230 may include an interface defined in the IEEE 802.3 and may include a data interface and a management interface between the PHY layer block 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer block 210 may include a PHY layer interface unit 211, a PHY layer processor 212, and a PHY layer memory 213. The configuration of the PHY layer block 210 is not limited thereto, and the PHY layer block 210 may be configured in various ways. The PHY layer interface unit 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller 220 may be configured to monitor and operate the PHY layer block 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer block 210 (e.g., the PHY layer interface 211) or an upper layer (not shown), transmit the received signal to the controller processor 222, and transmit the signal received from the controller processor 222 to the PHY layer block 210 or upper layer. The controller processor 222 may further include an independent memory control logic or an integrated memory control logic for operating the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed or a hard disc drive (HDD) or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Hereinafter, operation methods of a communication node belonging to a vehicle network and a counterpart communication node corresponding to the communication node will be described. However, even in a case that only an operation of a first communication node (e.g., transmission or reception of signals) is explained, a second communication node, a counterpart communication node corresponding to the first communication node, may perform a counter-operation (e.g., reception or transmission of signals) corresponding to the operation of the first communication node.

That is, even when only an operation of the first communication node is explained, it should be understood that the second communication node corresponding to the first communication node can perform a counter-operation of the operation of the first communication node. On the contrary, even when an operation of the second communication node is explained, it should be understood that the first communication node corresponding to the second communication node can perform a counter-operation of the operation of the second communication node.

Figure 3:
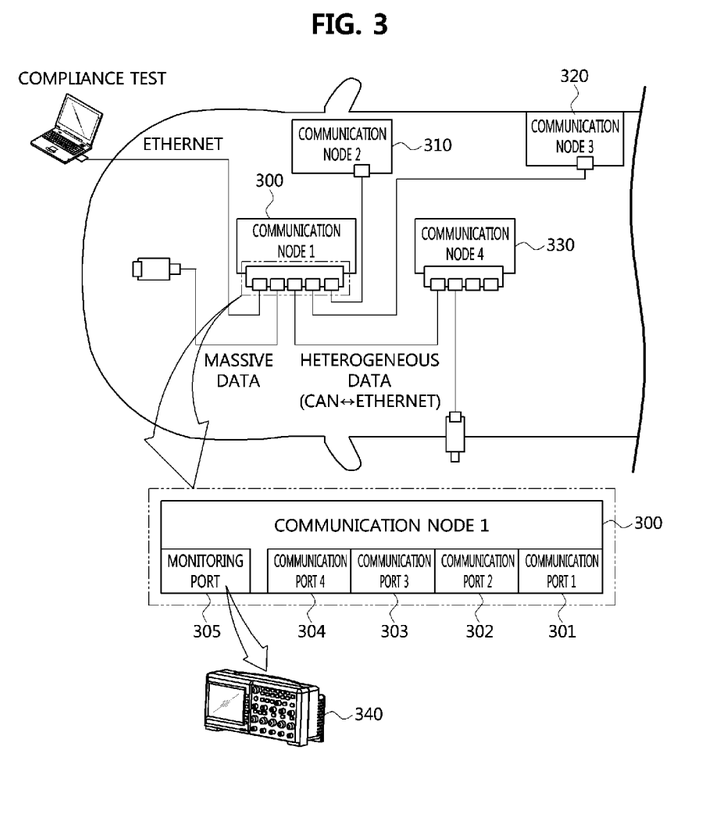
FIG. 3 is a conceptual view of an operation procedure of a compliance test apparatus for a communication node according to embodiments of the present disclosure.

FIG. 3 is a conceptual view of an operation procedure of a compliance test apparatus for a communication node according to embodiments of the present disclosure.

As shown in FIG. 3, communication nodes under an in-vehicle network compliance test are illustrated. That is, a first communication node 300, a second communication node 310, a third communication node 320, and a fourth communication 330 are installed in a vehicle. The compliance test for the communication nodes may be performed as they are connected to a vehicle network of the vehicle. That is, the compliance test according to the present disclosure may be an in-vehicle compliance test. The first communication node 300 connected to a CAN network or an Ethernet network may comprise first to fourth communication ports 301, 302, 303, and 304 each of which is connected to each communication node. In addition, the first communication node 300 may further comprise an additional monitoring port 305 for the compliance test. Also, the monitoring port 305 of the first communication node 300 may be connected to a test output apparatus 340 for the compliance test. The first communication port 301 may be connected to the second communication node 310, the second communication port 302 may be connected to the third communication node 320, and the third communication port 303 may be connected to the fourth communication node 330. The fourth communication port 304 may be connected to an external output port.

When a network compliance test for one of the communication nodes 310, 320, and 330 which are respectively connected to the communication ports 301, 302, and 303 is requested, one of the communication ports 301, 302, and 303 which is connected to the communication node on which the network compliance test is requested may be connected to the monitoring port 305. Then, a test response signal transmitted from the communication port under the test may be transferred to the monitoring port 305. The test response signal received at the monitoring port 305 may be transmitted to the test output apparatus 340 connected to the monitoring port 305. Then, the test output apparatus 340 may output test result information corresponding to the test response signal so that the result of the in-vehicle network complication test on the communication node can be identified.

Figure 4:
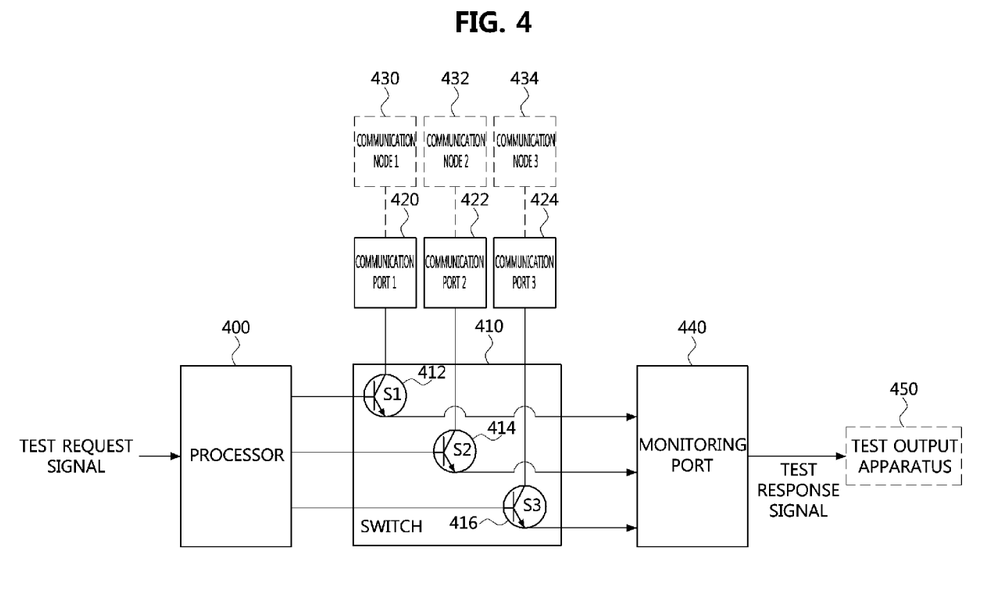
FIG. 4 is a block diagram illustrating a compliance test apparatus for a communication node according to embodiments of the present disclosure.

FIG. 4 is a block diagram illustrating a compliance test apparatus for a communication node according to embodiments of the present disclosure.

As shown in FIG. 4, a compliance test apparatus for a communication node may comprise a processor 400, a switch 410, and a monitoring port 440. In addition, first to third communication ports 420, 422, and 424 may be connected to the switch 410. Also, first to third communication nodes 430, 432, and 434 may be respectively connected to the communication ports 420, 422, and 424. Here, the number of the communication ports and the communication nodes is merely an example and should not be treated as limiting the scope of the present disclosure. The number of them may increase or decrease as needed.

The processor 400 may control the switch 410 to connect the monitoring port 440 to one of the first to third communication ports 422, 422, and 424. Hereinafter, a state in which a test request signal is not yet received may be referred to as a 'normal mode', and a state in which a test request signal is received may be referred to as a 'compliance test mode'.

In the normal mode, the processor 400 may control the switch 410 to turn off connections between the monitoring port 440 and all of the first to third communication ports 420, 422, and 424. That is, in the normal mode in which a compliance test is not being performed, the processor 400 may control the switch 410 to turn off all connections between the monitoring port 440 and all of the communication ports.

Meanwhile, in the compliance test mode in which a compliance test is being performed, the processor 400 may control the switch 410 to turn on a connection between the monitoring port 440 and one (i.e., a test target) of the communication ports 420, 422, and 424. After transitioning from the normal mode to the compliance test mode, the processor 400 may control the switch 410 to connect the monitoring port 440 to one of the communication ports. Here, the processor 400 may control the switch 410 to maintain connections between the monitoring port 440 and other communication ports except that connected to the monitoring port 440 as off-states.

According to a received test request signal, the processor 400 may control operation of the switch 410. The test request signal may be received through a vehicle network (e.g., Ethernet-based vehicle network, etc.). For reception of the test request signal, an interface unit (not depicted) may be required. However, explanation on the interface unit is omitted in the present description. Upon receiving the test request signal through the vehicle network, the processor 400 may identify a mode transition from the normal mode to the compliance test mode.

The received test request signal may comprise identification information or mode type information which corresponds to at least one of the communication ports.

The identification information may be information used for identifying communication nodes to be tested, and communication ports respectively connected to the communication nodes to be under test. The processor 400 may control operation of the switch 410 based on the identification information included in the received test request signal. Table 1 below shows an example of identification information for the first to third communication ports 420, 422, and 424 illustrated in FIG. 4.

TABLE 1

| Communication port | Identification Information |
|---|---|
| 1 | 0x10 |
| 2 | 0x20 |
| 3 | 0x30 |

For example, when the identification information included in the test request signal indicates '0x10' corresponding to the communication port 420, the processor 400 may transmit a switching control signal to the switch 410 so that the first communication port 420 can be connected to the monitoring port 440. Also, when the identification information included in the test request signal indicates '0x20' corresponding to the communication port 422, the processor 400 may transmit a switching control signal to the switch 410 so that the second communication port 422 can be connected to the monitoring port 440. Also, when the identification information included in the test request signal indicates '0x30' corresponding to the communication port 424, the processor 400 may transmit a switching control signal to the switch 410 so that the third communication port 424 can be connected to the monitoring port 440.

The processor 400 may control the switch 400 to maintain connections between the communication ports and the monitoring port while a new or changed test request signal is not received or a transition to the normal mode is not requested.

On the other hand, after one of the communication ports 420, 422, and 424 is connected to the monitoring port 440 according to switching operation of the switch 410, the processor 400 may transmit the mode type information included in the test request signal to the communication node connected to the monitoring port 440.

The mode type information may be information corresponding to a register code value to be configured in a register of the communication node 430, 432, or 434. For example, register code values to be configured for compliance tests may be represented as Table 2 below.

TABLE 2

| Mode type information | Code value | Description |
|---|---|---|
| Test Mode 1 | 0x2200 | Transmit droop test mode |
| Test Mode 2 | 0x4200 | Transmit jitter test in MASTER mode |
| Test Mode 3 | 0x6000 | Transmit jitter test in SLAVE mode |
| Test Mode 4 | 0x8200 | Transmit distortion mode |
| Test Mode 5 | 0xA200 | Power Spectral Density mask and power level test mode |

The mode type information included in the test request signal may be information indicating one of the test modes represented in Table 2. For example, when the mode type information included in the test request signal indicates '0x2200', the processor 400 may transmit the code value '0x2200' corresponding to the mode type information to the communication node connected to the monitoring port 440. Accordingly, the communication node receiving the mode type information may return a test response signal corresponding to the received mode type information to the monitoring port.

The switch 410 may turn on or off connections between the monitoring port 440 and the communication ports 420, 422, and 424. For this, the switch 410 may be respectively connected to the communication ports 420, 422, and 424 and the monitoring port 440. The switch 410 may include as many switching elements as the communication ports. For example, as illustrated in FIG. 4, the switch 410 may comprise a first switching element 412, a second switching element 414, and a third switching element 414 each of which is connected to the communication port 420, 422, or 424. Also, the switching elements 412, 414, and 416 may be respectively connected to the monitoring port 440. Also, the communication ports 420, 422, and 424 may be respectively connected to the communication nodes 430, 432, and 434.

The switch 410 may be configured with semiconductor elements. For example, the switching elements 412, 414, and 416 may be configured with one of a field effect transistor (FET), a junction-FET, a metal oxide semiconductor-FET (MOSFET), etc.

In the normal mode, when the switching control signal instructing to turn off connections between the monitoring port 440 and the communication ports 420, 422, and 424 is received from the processor 400, the switching element 412 may be controlled to turn off a connection between the monitoring port 440 and the first communication port 420, the switching element 414 may be controlled to turn off a connection between the monitoring port 440 and the second communication port 422, and the switching element 416 may be controlled to turn off a connection between the monitoring port 440 and the third communication port 424.

Meanwhile, in the compliance test mode, when the switching control signal instructing to turn on a connection between the monitoring port 440 and one of the communication ports 420, 422, and 424 is received from the processor 400, the switch 410 may connect the monitoring port to the communication port which has been requested to be switched to the monitoring port 440. For example, when the processor 400 requests the switch 410 to turn on the connection between the first communication port 420 and the monitoring port 440, the first switching element 412 may connect the first communication port 420 to the monitoring port 440. Meanwhile, the second switching element 414 may maintain the connection between the second communication port 422 and the monitoring port 440 as off-state, and the third switching element 416 may maintain the connection between the third communication port 424 and the monitoring port 440 as off-state.

According to the switching operation of the switch 410, after the monitoring port 440 is connected to one of the communication ports 420, 422, and 424, the processor 400 may transmit the mode type information indicating a compliance test mode to the communication node connected to the monitoring port 440. Accordingly, the communication node receiving the mode type information may generate a test response signal corresponding to the mode type information, and transmit the generated test response signal to the monitoring port 440 through the switch 410. For example, when the identification information included in the received test request signal corresponds to '0x10' in Table 1, and the mode type information included in the received test request signal corresponds to '0x2200' in Table 2, the switching element 412 may turn on the connection between the first communication port 420 corresponding to the value '0x10' and the monitoring port 440, and thus the code value '0x2200' of the mode type information may be transmitted to the first communication node 430 connected to the first communication port 420. Accordingly, the communication node 430 may generate a test response signal of the 'droop test' corresponding to the code value 0x2200, and transmit the generated 'droop test' response signal to the monitoring port 440 through the communication port 420 and the switching element 412.

The monitoring port 440 is a port prepared for a compliance test for communication nodes, and one end of it may be connected to the switch 410. That is, one end of the monitoring port 440 may be connected respectively to the switching elements 412, 414, and 416. Also, the other end of the monitoring port 440 (i.e., output port) may be connected to the test output apparatus 450 which outputs a result of the compliance test for communication nodes. Here, the test output apparatus 450 may comprise a compliance test apparatus such as an oscilloscope, etc.

The monitoring port 440 may receive the test response signal according to the mode type information from the communication node corresponding to the communication port connected to it. The monitoring port 440 may transmit the received test response signal to the test output apparatus 450 connected to the output port. For example, when the connection between the communication port 420 and the monitoring port 440 is turned-on by the first switching element 412, the monitoring port 440 may receive the test response signal of 'droop test' corresponding to the code value '0x2200' from the communication node 430 through the communication port 420. Then, the monitoring port 440 may transmit the received test response signal of 'droop test' to the test output apparatus 450. Accordingly, the test output apparatus 450 may output test result information of the droop test corresponding to the test response signal.

Figure 5:
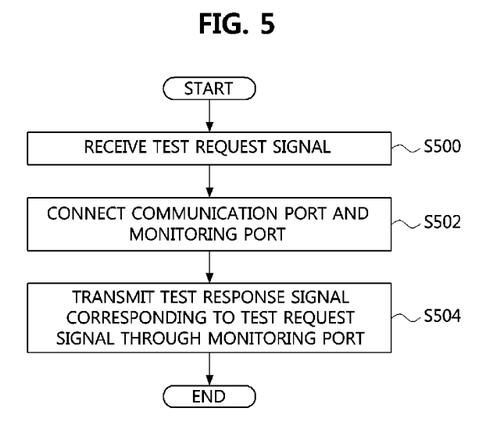
FIG. 5 is a flow chart illustrating a compliance test method for a communication node according to embodiments of the present disclosure.

FIG. 5 is a flow chart illustrating a compliance test method for a communication node according to embodiments of the present disclosure.

As shown in FIG. 5, a test request signal for a communication node may be received (S500). The test request signal may be received through a vehicle network (e.g., Ethernet-based vehicle network, etc.). The received test request signal may comprise identification information or mode type information for the compliance test mode which corresponds to each of the communication ports.

After the step S500, according to the received test request signal, a communication port connected to at least one communication node may be connected to the monitoring port (S502). Here, according to the identification information corresponding to the communication port indicated by the received test request signal, the communication port may be connected to the monitoring port.

For example, as illustrated in Table 1 and FIG. 4, when the identification information included in the test request signal indicates '0x10' corresponding to the communication port 420, the first communication port 420 may be connected to the monitoring port 440. Also, when the identification information included in the test request signal indicates '0x20' corresponding to the communication port 422, the second communication port 420 may be connected to the monitoring port 440. Also, when the identification information included in the test request signal indicates '0x30' corresponding to the communication port 424, the third communication port 424 may be connected to the monitoring port 440. Connection states between the communication ports and the monitoring port may be maintained while a new or changed test request signal is not received or a transition to the normal mode is not requested.

In the normal mode (i.e., when a test request signal is not received), connections between the monitoring port and all of the communication ports may be turned off. For example, as illustrated in FIG. 4, connections between the monitoring port 440 and all of the communication ports 420, 422, and 424 may be turned off.

In the compliance test mode (i.e., when a test request signal is received), a connection between the monitoring port and one of the communication ports may be turned on. For example, as illustrated in FIG. 4, if a connection between the first communication port 420 and the monitoring port 440 is requested to be turned on, the first communication port 420 may be connected to the monitoring port 440. Here, other communication ports 422 and 424 except the first communication port 420 may maintain their connection states to the monitoring port 440 as off-state.

After the step S502, a test response signal of the communication node corresponding to the test request signal may be transmitted to the test output apparatus through the monitoring port (S504). When the monitoring port is connected to one of the communication ports, the mode type information indicating a compliance test mode may be transmitted to the communication node connected to the monitoring port. As represented in Table 1, the mode type information included in the test request signal may indicate one of the test modes listed in Table 1. For example, if the mode type information indicates a code value '0x2200', the code value '0x2200' of the mode type information may be transmitted to the communication node connected to the monitoring port.

The communication node receiving the mode type information may generate a test response signal corresponding to the mode type information, and transmit the generated test response signal to the monitoring port. For example, the communication node receiving the code value '0x2200' may generate a test response signal of the 'droop test' corresponding to the code value 0x2200, and transmit the generated 'droop test' response signal to the monitoring port 440 through the connected communication port and the switch.

The monitoring port may receive the test response signal according to the mode type information from the communication node corresponding to the communication port connected to it. The monitoring port may transmit the received test response signal to the test output apparatus. For example, as illustrated in Table 2 and FIG. 4, when the connection between the communication port 420 and the monitoring port 440 is turned-on by the first switching element 412, the monitoring port 440 may receive the test response signal of 'droop test' corresponding to the code value '0x2200' from the communication node 430 through the communication port 420. Then, the monitoring port 440 may transmit the received test response signal of 'droop test' to the test output apparatus 450. Accordingly, the test output apparatus 450 may output test result information of the droop test corresponding to the test response signal.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

Alternatively, the communication node may adjust the size of a reserved bandwidth in case that a part of the bandwidth reserved for transmitting the first frame needs to be used for a third frame (e.g., a frame including a data unit generated based on TCP/IP). In other words, the communication node may reduce the size of a reserved bandwidth. Thus, the communication node may transmit the first frame through the reduced bandwidth and may transmit the third frame through the rest of the total bandwidth. The communication node may initialize the reduced bandwidth (i.e., increase the size of bandwidth) upon completing transmission of the second frame and may transmit the first frame through the initialized bandwidth.

While the embodiments of the present disclosure and their advantages have been described in detail above, it should be understood that various changes, substitutions and alterations may be made herein without departing from the scope of the disclosure. Thus, the disclosed embodiments are intended to cover various modifications and equivalent arrangements included within the spirit and scope of the appended claims.

What is claimed is:

1. An apparatus for a compliance test on a communication node constituting a communication network, the apparatus comprising:
   a monitoring port connected to a compliance test apparatus;
   a first communication port connected to a first communication node in the communication network;
   a first switch turning on or off a first connection between the monitoring port and the first communication port;
   a second communication port connected to a second communication node in the communication network;
   a second switch turning on or off a second connection between the monitoring port and the second communication port; and
   a processor controlling the first and second switches to turn on or off the first and second connections,
   wherein the processor receives, from the compliance test apparatus, a test request signal including identification information which identifies the first communication node or the second communication node as performing the compliance test, and controls the first switch to turn on the first connection when the identification information identifies the first communication node as performing the compliance test.

2. The apparatus according to claim 1, wherein the test request signal further includes mode type information indicating a compliance test mode.

3. The apparatus according to claim 2, wherein the processor transmits a test response signal corresponding to the mode type information to the compliance test apparatus which outputs a result of the compliance test performed on the first communication node or the second communication node through the monitoring port.

4. The apparatus according to claim 2, wherein the mode type information corresponds to a code value to be configured in a register of the first and second communication nodes.

5. The apparatus according to claim 1, wherein the processor controls the first and second switches to turn off the first and second connections in a normal mode, and controls the first and second switches to turn on the first and second connections in a compliance test mode.

6. The apparatus according to claim 1, wherein each of the first and second switches is configured with at least one semiconductor element.

7. The apparatus according to claim 1, wherein the compliance test is performed as the first communication node is or the second communication node connected to a vehicle network.

8. An operation method performed by an apparatus configured to perform a compliance test in a communication network, the operation method comprising:
   receiving, from a compliance test apparatus, a test request signal including identification information which identifies a first communication node as performing the compliance test through a monitoring port included in the apparatus;
   identifying a first communication port among a plurality of communication ports included in the apparatus, the first communication port connected to the first communication node identified by the identification information;
   activating a first connection between the monitoring port and the first communication port by controlling a first switch included in the apparatus, the first switch turning on or off the first connection; and
   transmitting, to the compliance test apparatus, a test response signal for the first communication node through the monitoring port,
   wherein the apparatus further includes a second communication port connected to a second communication node and a second switch turning on or off a second connection between the monitoring port and the second communication port.

9. The operation method according to claim 8, wherein the apparatus turns off each of the first and second connections in a normal mode, and the apparatus turns on each of the first and second connections in a compliance test mode.

10. The operation method according to claim 8, wherein the test response signal is transmitted to the compliance test apparatus which outputs a result of the compliance test performed on the first communication node or the second communication node through the monitoring port.

11. The operation method according to claim 8, wherein the test request signal further includes mode type information corresponding to a code value to be configured in a register of the first and second communication nodes.

12. The operation method according to claim 8, wherein the compliance test is performed as the first communication node or the second communication node is connected to a vehicle network.

* * * * *